Figure 1:
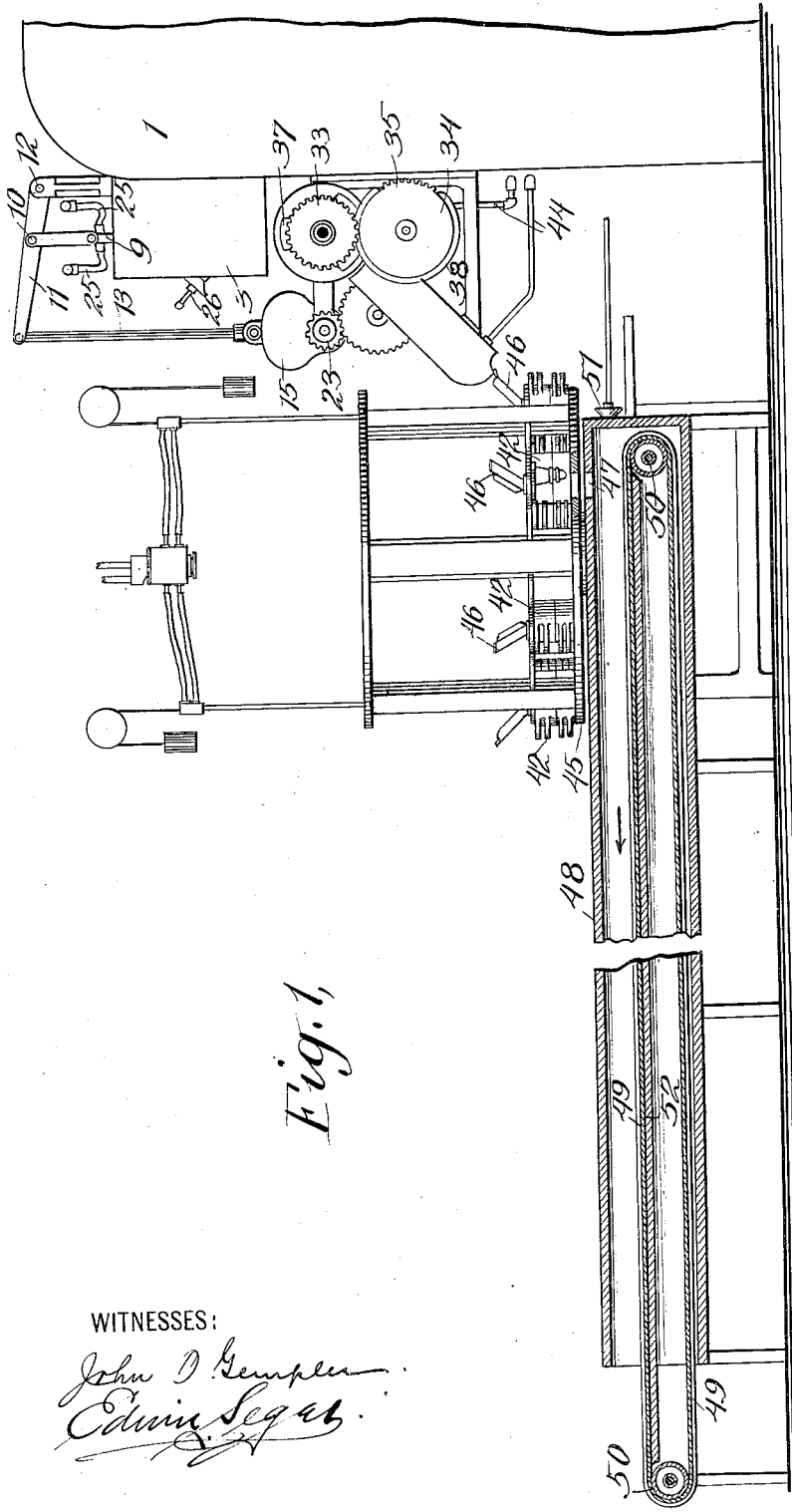

No. 836,297. PATENTED NOV. 20, 1906.
H. M. BROOKFIELD.
APPARATUS FOR MAKING GLASS INSULATORS OR OTHER SIMILAR GLASS ARTICLES.
APPLICATION FILED NOV. 15, 1901.

3 SHEETS—SHEET 1.

WITNESSES:
John D. Gempler
Edwin Segal

INVENTOR
Henry M. Brookfield
BY Kenyon & Kenyon
ATTORNEYS

No. 836,297. PATENTED NOV. 20, 1906.
H. M. BROOKFIELD.
APPARATUS FOR MAKING GLASS INSULATORS OR OTHER SIMILAR
GLASS ARTICLES.
APPLICATION FILED NOV. 15, 1901.
3 SHEETS—SHEET 2.
Fig. 2,
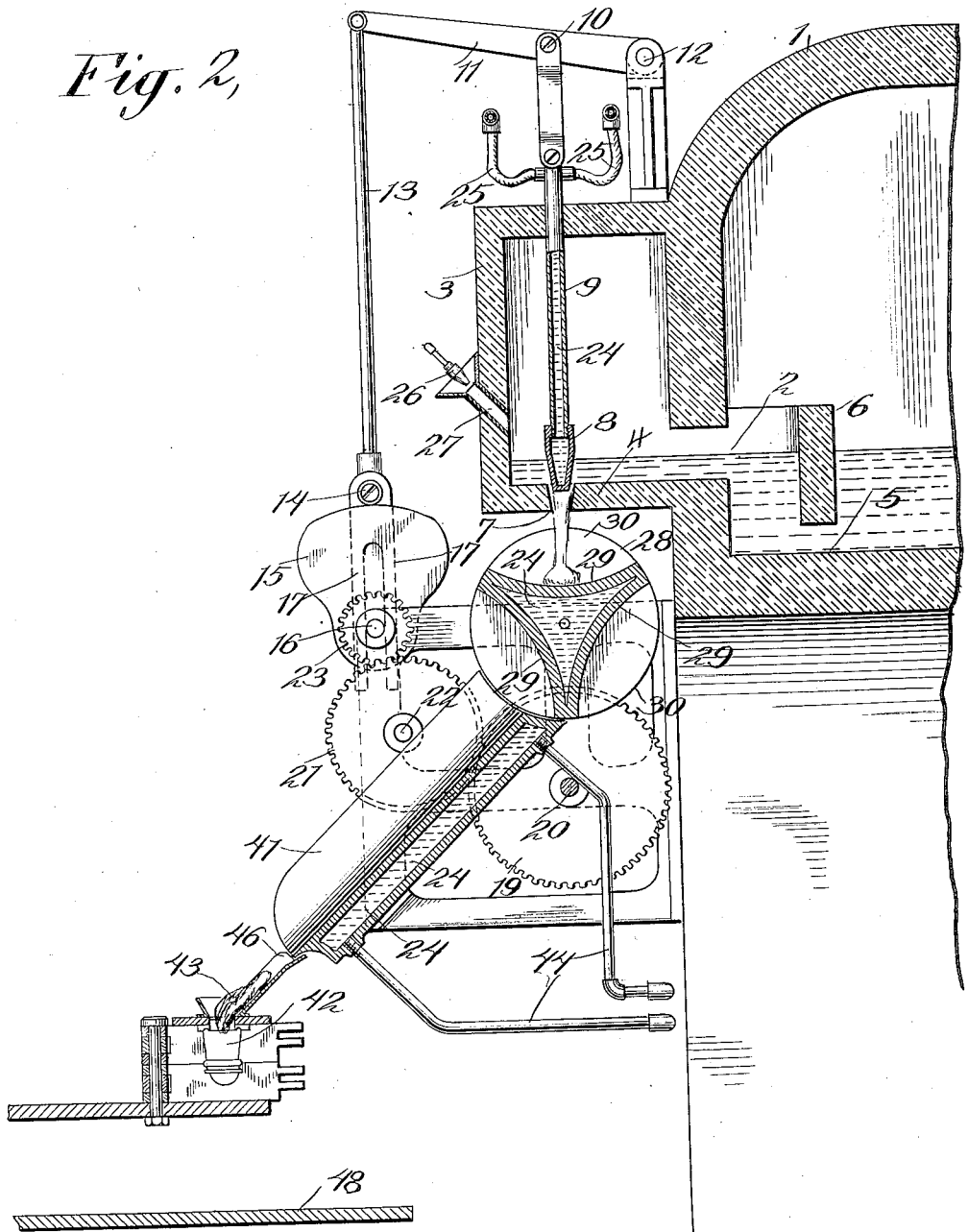
WITNESSES:
INVENTOR
Henry M. Brookfield
BY
Kenyon & Kenyon
ATTORNEYS No. 836,297. PATENTED NOV. 20, 1906.
H. M. BROOKFIELD.
APPARATUS FOR MAKING GLASS INSULATORS OR OTHER SIMILAR GLASS ARTICLES.
APPLICATION FILED NOV. 15, 1901.

3 SHEETS—SHEET 3.

WITNESSES:
John O. Gempler
Edwin Segel

INVENTOR
Henry M. Brookfield
BY
Kenyon & Kenyon
ATTORNEYS

UNITED STATES PATENT OFFICE.

HENRY M. BROOKFIELD, OF NEW YORK, N. Y.

APPARATUS FOR MAKING GLASS INSULATORS OR OTHER SIMILAR GLASS ARTICLES.

No. 836,297.      Specification of Letters Patent.      Patented Nov. 20, 1906.

Application filed November 15, 1901. Serial No. 82,368.

*To all whom it may concern:*

Be it known that I, HENRY M. BROOKFIELD, a citizen of the United States, and a resident of the city, county, and State of New York, have invented certain new and useful Improvements in Apparatus for Making Glass Insulators or other Similar Glass Articles, of which the following is a specification.

My invention relates to apparatus for making glass insulators or similar articles. Its object is to make the operation of such apparatus more truly automatic than has heretofore been possible and more certain and accurate, to reduce the cost of the manufacture of said articles and to simplify such apparatus and make it more compact; also, to provide devices for automatically feeding molten glass from the furnace to the molds, to render such feeding certain and accurate, and to provide means for adjusting such feeding devices to vary the amount of feed as required; also, to provide means for making the process of manufacturing glass insulators or similar articles, from the discharge of the glass from the furnace to and through the annealing of such articles a continuous and automatic one, thus avoiding the necessity of manual interference or of handling the insulators during such operation; also, to improve the finished articles and to make them more perfect and of a better appearance.

It consists of the novel devices and combinations herein shown and described.

I have shown my improvement in connection with a press for making glass insulators, although it is obvious that it may be employed with other apparatus and for making other similar articles from molten glass.

In the drawings accompanying this specification and forming part hereof I have shown and will now proceed to describe my improvement as embodied in its preferred form in connection with a press for making glass insulators.

Figure 4:
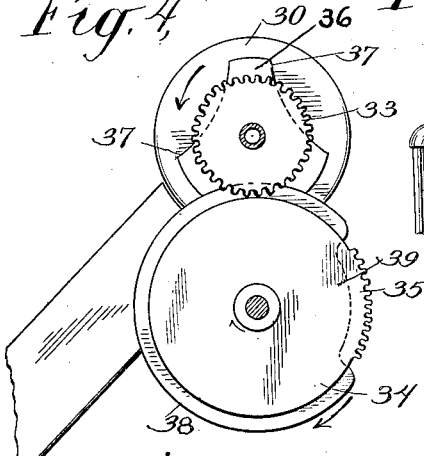
Figure 3:
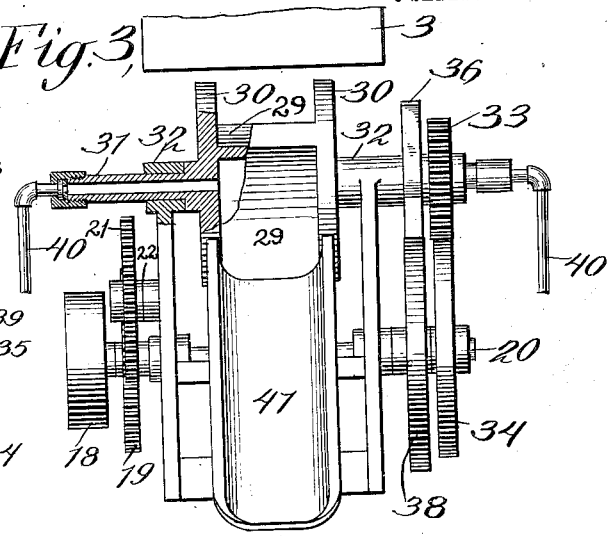
Figure 5:
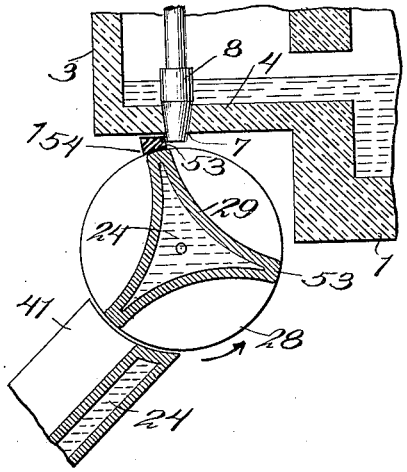
Figure 6:
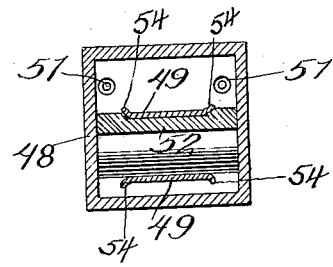

In such drawings, Figure 1 represents, partly in side elevation and partly in longitudinal section, such a press, many of the parts of the said press having no direct connection with my improvement, being omitted for sake of clearness, and the furnace being shown only in part. Fig. 2 is a longitudinal section through a part of the furnace and the devices for feeding, measuring, and delivering the molten glass from the furnace to the molds. Fig. 3 is a front view, partly in section, of a part of the said feeding, measuring, and delivering devices. Fig. 4 is a detail and side view of part of the said mechanism. Fig. 5 shows a modification of the feeding and measuring devices, and Fig. 6 is a cross-section taken through the leer.

Referring to the form of my invention shown in the drawings, 1 represents a glass-furnace, and 2 the molten glass therein. The furnace is provided, as shown in Figs. 2 and 5, with a discharge-chamber 3, whose floor 4 is raised above the level of the floor 5 of the main part of the furnace.

6 is a boot of ordinary construction to prevent the scum on the surface of the molten glass in the main part of the furnace from passing into the discharge-chamber.

The floor 4 of the discharge-chamber is provided with an orifice 7, preferably beveled, as shown, for the better seating upon it of a valve 8. This valve controls the discharge of the molten glass from the furnace, and this valve may be raised from its seat or lowered upon it by any suitable means. As shown, it is raised and lowered by the following described mechanism: The rod 9, which carries valve 8, is pivotally secured at 10 to lever 11, fulcrumed at 12 and provided at its other end with a rod 13, carrying a roller 14, which runs upon a cam 15, mounted on shaft 16, fingers 17 of rod 13 embracing the shaft, as shown in Fig. 2, in the ordinary manner. Shaft 16 is driven from pulley 18, to which power is imparted from any suitable source through gear 19, mounted on the same shaft 20, which carries pulley 18, gear 21 turning on stud 22 and meshing with gear 19 and gear 23 on shaft 16. By these means valve 8 is automatically controlled and is opened the proper distance and kept open just the exact length of time necessary to permit the desired amount of molten glass to escape from the furnace. By changing the speed of the driving parts or by adjusting the gearing the amount of discharge can be accurately adjusted. I also prefer to make valve 8 adjustable upon rod 9, as by means of screw-threads, as shown in Fig. 2, in order to furnish an additional means of adjustment. Valve 8 is provided with beveled surfaces to seat upon the beveled surfaces of orifice 7, as shown in Fig. 2.

The above means furnish adjustable feeding and measuring devices for accurately separating the molten glass discharged from the furnace into masses of the exact amount desired.

Rod 9 and valve 8 are preferably made hollow, as shown, so that they may be supplied with a cooling medium 24 to keep these parts at the proper temperature. Any cooling medium may be used, which is supplied, as shown, through pipes 25 from any suitable source. Unless valve 8 is cooled it is liable to be speedily burned out.

26 is a burner of any suitable construction for throwing a jet of flame through orifice 27 upon the glass in the discharge-chamber to keep it at the proper temperature at the point of discharge.

I provide means for automatically delivering to the molds the molten glass as it is discharged in separate masses from the furnace. For this purpose I preferably provide a rotating receiver 28, adapted to receive the separated masses and remove them from the point of their discharge from the furnace, so that they may be delivered to the molds. In the form shown the receiver is provided with a plurality of dished surfaces 29, each provided with bounding side walls 30. The receiver is mounted integral with shaft 31 in sleeves or bearings 32, carried by the framework of the machine, and shaft 31 is intermittently rotated through gear 33 and wheel 34, the latter having a segment 35 provided with gear-teeth, as shown in Fig. 4. Gear 34 is mounted on shaft 20 and at each revolution rotates the receiver, in the form shown in the drawings, one-third of a rotation, bringing a new dished surface into place to receive another mass of molten glass.

The receiving-surface is locked into position after each one-third revolution. For this purpose a disk 36 is mounted on shaft 31, provided with dished surfaces 37, corresponding to those of the receiver, and a disk 38 is mounted on shaft 20 to engage the surfaces 37, as shown in Fig. 4. A part of the periphery of disk 38 is cut away, as at 39. This cut-away portion is opposite to the toothed segment of wheel 34, as shown in Fig. 4. This arrangement unlocks the receiver-shaft at the time that gear 35 meshes with gear 33 and permits shaft 31 and the receiver with it to rotate one-third of a revolution. The receiver may be composed of one or any number of receiving-surfaces and may be of any desired form or construction. As shown, it is composed of three receiving-surfaces. The interior of the receiver is preferably made hollow to receive a cooling medium 24, supplied to it through pipes 40 and the hollow interior of shaft 31. Unless the receiver is cooled the molten glass is liable to stick to its surfaces.

The molten glass can be removed from the receiver for delivery to the molds by any suitable means. As shown in the drawings, I provide for this purpose a trough 41, placed so that at each one-third rotation of the receiver the molten glass is emptied from one of the dished surfaces upon which it was fed into the trough and passes down through the trough into a mold 42.

43 in Fig. 2 is a mass of molten glass just passing into the mold.

Trough 41 is cooled by any suitable cooling medium 24 through pipes 44 in order to prevent the sticking of the glass to its surface.

It is not essential to my broad invention that delivering mechanism be interposed between the rotating receiver and the mold—as, for example, in cases where the mold is arranged to pass immediately beneath the receiver and to receive the separated masses directly from the receiver itself. I prefer, however, to insert some intermediate mechanism, like the trough and its appurtenances above described.

Molds of any suitable form or description may be employed, and these molds may be operated by hand or automatically in any well-known manner. As such mechanism, separately considered, forms no part of the present invention, I have not shown it in detail, but have merely represented in Fig. 1 a turn-table 45, of well-known construction, provided with a series of molds 42. This table is rotated in the ordinary way, bringing each mold in turn opposite trough 41. I preferably provide an additional trough 46, fixed to each mold or to the turn-table at each mold to carry the molten glass from trough 41 into the mold proper. The table is further rotated after the glass has been poured into the mold, and the insulator is made in any well-known way, either manually or automatically, and by a further rotation of the table the mold is brought opposite an opening 47 in a leer 48. For this purpose the leer is placed in close proximity to the turn-table of the press, its forward end being under the point where the insulators are discharged from the press. As the molds open and the insulators are discharged they fall through the opening 47 into the leer and upon an endless carrier 49 of any suitable construction, carried by rollers 50. Either one or both of these rollers is driven in any suitable manner to impart movement to the endless carrier. As such driving mechanism forms no part of the present invention and as it may be of any construction, I have not shown it in the drawings.

Each insulator when it is discharged from the mold drops through opening 47 upon the endless carrier and is carried in the direction of the arrow through the leer to the delivery or left-hand end, as shown in Fig. 1, where it is removed from the carrier.

In the best form of my invention the leer is closed on all sides except at the delivery end and except at the opening 47 and is heated in any suitable manner—as, for example, by burners 51, which are placed, preferably, at the forward end of the leer.

52 is a support for the upper portion of the endless carrier to prevent it from sagging under the weight of the insulators. The carrier is preferably provided with raised edges 54.

The leer is made of sufficient length, and the carrier is driven at such a speed as to properly anneal the insulators while they are being carried through the leer. All handling of the insulators or other articles upon their discharge from the press is avoided. The insulators are dropped at once into the leer and are annealed before any handling of them becomes necessary. My improvement accordingly not only saves in labor and expense, but also tends to prevent injury to the insulators through handling them before annealing.

In the form of my device heretofore shown and described the feeding and measuring devices for feeding and separating the glass into masses of the desired amount consist of a valve 8, rod 9, and the means for opening and closing the valve and for timing such movement. If desired, however, valve 8 could be so arranged and connected as to be open during all the time the press is working and the glass be separated and measured by means of the rotating receiver. In Fig. 5 I have shown a modification constructed on this plan. Fig. 5 represents a longitudinal section through the receiver and a part of the furnace and trough. It is intended merely to illustrate, without giving all of the details and connections, the modification last above referred to. In this case valve 8 can be opened and closed in any suitable way—as, for instance, by hand—and be left open during the operation of the press. A steady stream of molten glass will accordingly flow down onto the receiver. The receiver in such case will be continuously rotated and at such a speed that from the time one edge 53 of the dished surface passes the opening 7 in the furnace until the other edge 53 of the same dished surface passes the said point the exact amount of molten glass required for each insulator or other article will have flowed down through the opening upon the dished surface 29. A scraper 154, secured to the framework of the press in any suitable manner, (not shown,) is arranged near the top of the receiver in close proximity to the lefthand end of opening 7, as seen in Fig. 5. This scraper is so arranged that it will press against each edge 53 and push or scrape the molten glass that may have fallen upon it back onto the next dished surface 29. Each mass of molten glass is emptied by its dished surface upon trough 41 in the manner already described.

Many modifications and departures from the particular form of devices shown in the drawings may of course be made without departing from my invention, the essentials of which are set forth in the claims appended hereto.

By means of my improvement the operation of a press for making glass insulators or similar articles may be made truly automatic and be made certain and accurate. The amount of molten glass supplied in each instance is accurately and with certainty determined. Such feed can be easily, accurately, and with certainty adjusted in order to vary the amount of glass supplied to the molds. The annealing of the finished insulators or other articles is simplified and made automatic and the annealing itself perfected. The apparatus of the press is simplified and made more compact and the cost of making glass insulators or similar articles materially reduced, and the articles themselves are made better in appearance and perfect in form.

In the best form of my invention the devices for feeding the glass from the furnace, for separating the glass and for delivering it into the mold, and for delivering it from the mold into the leer and conveying it through the leer are all automatic. My invention, however, in some of its features is not restricted to such automatic operation. For example, it is not essential that the different devices for accomplishing the different steps should all be automatic. One or more of them, as desired, may be manually performed or be manually actuated. I prefer, however, the automatic operation throughout, as thereby time and labor are saved. In both cases, however, the manufacture of articles is a continuous one, whether all of the devices are operated automatically or not. It is important to provide means for cooling the different metallic surfaces with which the molten glass comes into contact, as otherwise such surfaces will become heated and the glass will stick to them and clog the apparatus and stop its operation.

Attempts have heretofore been made to feed glass automatically from a furnace and separate it into masses of the desired amount for delivery to molds; but all such attempts, so far as I know and am informed, have been unsuccessful. By my improved apparatus the obstacles that have heretofore made such devices inoperative and useless are all overcome. In no case that I am aware of, however, has any attempt been made to continuously and automatically manufacture glass insulators from the discharge of the molten glass from the furnace to and through the annealing of the insulators.

The form of mold shown herein forms no part of the present invention and is not claimed in this application; but it is not abandoned, as it is the intention to make it the subject-matter of another application.

The specific form of annealing apparatus herein shown and described is not separately claimed in this application, as it forms the subject-matter of another application of mine, divisional hereof.

The specific form of devices for feeding the molten glass from the furnace and separating it into masses of the desired amount and delivering, as are herein shown and described, is not separately claimed in this application, as it forms the subject-matter of another application of mine, divisional hereof. Similarly, the process of making glass insulators or similar articles illustrated herein is not specifically claimed in this application, as it forms the subject of another application of mine.

What I claim as new, and desire to secure by Letters Patent, is—

1. In apparatus for making glass insulators or other similar glass articles, the combination of devices for automatically feeding the molten glass from a furnace in a small stream and for automatically separating the said stream into masses of the desired amount, a mold, a leer for annealing the glass insulators or other articles arranged to receive the glass insulators or other articles from the mold and provided with a carrier for conveying the said articles through the leer.

2. In apparatus for making glass insulators or other similar glass articles, the combination of devices for automatically feeding the molten glass from the furnace in a small stream and for separating the said stream into masses of the desired amount, a mold, and means for delivering the glass into the mold, a leer for annealing the glass insulators or other articles, arranged with one end under the point of discharge of the glass insulators or other articles from the mold, and provided with a carrier for receiving said articles as they are discharged from the mold for conveying them through the leer.

3. In apparatus for making glass insulators or other similar glass articles, the combination of adjustable devices for automatically feeding the molten glass from a furnace in a small stream and separating the said stream into masses of the desired amount, and means for delivering the glass into a mold, and a mold for forming the glass insulators or other articles.

4. In apparatus for making glass insulators or other similar glass articles, the combination of devices for automatically feeding the molten glass from a furnace in a small stream, adjustable measuring devices for separating the said stream into masses of any desired amount, and means for delivering the glass into a mold, and a mold for forming the glass insulators or other articles.

5. In apparatus for making glass insulators or other similar glass articles, the combination of a furnace for the molten glass provided with a small orifice for the discharge of the glass, a valve for said orifice to control the discharge of molten glass therefrom, devices automatically actuated for opening and closing said valve to control the said discharge, and a mold for forming the glass insulators or other articles.

6. In apparatus for making glass insulators or other similar glass articles, the combination of a furnace for the molten glass provided with a small orifice for the discharge of the glass, a valve for said orifice to control the discharge of molten glass therefrom, devices automatically actuated for opening and closing said valve to control the said discharge, means for delivering the glass into a mold, and a mold for forming the glass insulators or other articles.

7. In apparatus for making glass insulators or other similar glass articles, the combination of a furnace for the molten glass provided with a small orifice for the discharge of the glass, an adjustable valve for said orifice to control the discharge of molten glass therefrom and to regulate its amount, devices automatically actuated for opening and closing said valve to control the said discharge, and means for delivering the glass into a mold, and a mold for forming the glass insulators or other glass articles.

8. In apparatus for making glass insulators or other similar glass articles, the combination of adjustable devices for automatically feeding molten glass from a furnace in a small stream and for separating the said stream into masses of the desired amount, a mold for forming the glass insulators or other articles, and a leer for annealing the articles arranged to receive the articles from the mold, and provided with a carrier for conveying them through the leer.

9. In apparatus for making glass insulators or other similar glass articles, the combination of a furnace for the molten glass provided with a small orifice for the discharge of the glass, a valve for said orifice to control the discharge of molten glass therefrom, devices automatically actuated for opening and closing the said valve to control the said discharge, a mold for forming the glass insulators or other articles, and a leer arranged to receive the said articles from the mold and provided with a carrier for conveying them through the leer.

10. In apparatus for making glass insulators or other similar glass articles, the combination of a furnace for the molten glass provided with a small orifice for the discharge of the glass, and an adjustable valve for said orifice to control the discharge of molten glass therefrom and to regulate its amount, devices automatically actuated for opening and closing the said valve to control the said discharge a mold for forming the glass insulators or other articles, and a leer arranged to receive the articles from the mold and provided with a carrier for conveying them through the leer.

11. In apparatus for making glass insulators or other similar glass articles, the combination of a furnace for the molten glass, provided with a discharge-chamber having its floor raised above the level of the floor of the main part of the furnace, a small orifice in the floor of the discharge-chamber for the discharge of the glass, a valve for said orifice to control the discharge of molten glass therefrom, a boot separating the discharge-chamber from the main part of the furnace, devices automatically actuated for opening and closing the said valve to control the said discharge, and a mold for forming the glass insulators or other articles.

12. In apparatus for making glass insulators or other similar glass articles, the combination of devices for feeding molten glass from a furnace in a small stream and a rotating receiver adapted to receive the glass, when fed from the furnace, and to remove it for delivery to a mold, a lock for holding the receiver in position to receive the molten glass from the furnace, and a mold.

13. In apparatus for making glass insulators or other similar glass articles, the combination of devices for automatically feeding molten glass from the furnace and separating the glass into masses of the desired amount, a rotating receiver adapted to receive the separated masses and to remove them for delivery to a mold, a mold, and a leer arranged to receive the glass insulators or other articles from the mold, and provided with a carrier for conveying them through the leer and means for delivering the insulators automatically from the mold to the leer.

14. In apparatus for making glass insulators or other similar glass articles, the combition of a furnace for the molten glass provided with a small orifice for the discharge of the glass, a valve for said orifice to control the discharge of the molten glass therefrom, a rotating receiver adapted to receive the glass when fed from the furnace, and to remove the glass for delivery to a mold, a mold, and a leer arranged to receive the glass insulators or other articles from the mold, and provided with a carrier to convey the said articles through the leer.

15. The combination with a press for making glass insulators or other similar glass articles, provided with one or more molds, of a leer for annealing the articles arranged with its forward end under the point of discharge of the glass insulators or other articles from the mold or molds of the press, and provided with an opening in its upper wall at said point for the passage of the insulators or other articles when discharged from the mold, and an endless carrier for receiving such articles and for conveying them through the leer.

16. The combination with a press for making glass insulators or other similar glass articles provided with one or more molds for making said articles, of a leer for annealing the articles provided with an opening for the passage of the insulators or other articles, and an endless carrier for receiving and conveying the articles through the leer.

17. In apparatus for making glass insulators or other similar glass articles, the combination of a furnace, devices for feeding molten glass from the furnace, and a hollow rotating receiver adapted to receive the glass when fed from the furnace, and to remove it for delivery to a mold, means for supplying a cooling medium to the interior of the receiver, and a mold.

18. In apparatus for making glass insulators or other similar glass articles, the combination of adjustable devices for automatically feeding molten glass from a furnace in a small stream and separating the said stream into masses of the desired amount, and a mold for forming the glass insulators or other similar glass articles.

19. In apparatus for making glass insulators or other similar glass articles, the combination of a furnace, devices for automatically feeding molten glass from the furnace in a small stream and separating the said stream into masses of the desired amount, and a rotating receiver adapted to receive the separated masses and to remove them for delivery to a mold, and a mold.

20. In apparatus for making glass insulators or other similar glass articles, the combination of a furnace, devices for automatically feeding molten glass from the furnace in a small stream, means for automatically separating the said stream into masses of the desired amount, and a receiver separated from the orifice of the furnace adapted to receive the separated masses and to remove them for delivery to a mold, and a mold.

21. In apparatus for making glass insulators or other similar glass articles, the combination of a furnace for the molten glass provided with a small orifice for the discharge of the glass, a valve for said orifice to control the discharge of molten glass therefrom, devices automatically actuated for opening and closing said valve to control the said discharge, a rotating receiver separated from the orifice of the furnace and adapted to receive the separated masses fed from it, and to remove them for delivery to a mold, and means automatically actuated for rotating the receiver to bring it under the orifice when the valve is opened, and to rotate it to its delivery-point when the valve is closed, and a mold.

22. In apparatus for making glass insulators or other similar glass articles, the combination of devices for automatically feeding molten glass from the furnace, and for separating the glass into masses of the desired amount, a rotating receiver separated from the point of discharge of the molten glass from the furnace and provided with a plurality of dished surfaces adapted to receive the separated masses and to remove the same for delivery to a mold, and a mold for forming the glass insulators or other articles.

23. In apparatus for making glass insulators or other similar glass articles, the combination of devices for automatically feeding the molten glass from a furnace in a small stream and separating the said stream into masses of the desired amount, a receiver separated from the point of discharge of the molten glass from the furnace and adapted to receive the separated masses of glass and to remove them for delivery to a trough, a trough for conveying the molten glass to a mold, and a mold for forming the glass insulators or other articles.

24. In apparatus for making glass insulators or other similar glass articles, the combination of devices for feeding molten glass from a furnace in a small stream, means for heating the glass to keep it at the proper temperature at the point of discharge, means for automatically separating the stream of glass into masses of the desired amount, means for delivering the separated masses to a mold, and a mold.

25. In apparatus for making glass insulators or other similar glass articles, the combination of devices for automatically feeding the molten glass from a furnace in a small stream, devices for heating the glass to keep it at the proper temperature at the points of discharge, means for automatically separating the said stream into masses of the desired amount, means for automatically delivering the separated masses to a mold, and a mold.

26. In apparatus for making glass insulators or other similar glass articles, the combination of devices for feeding the molten glass from a furnace, a receiver separated from the point of discharge of the molten glass from the furnace, and adapted to receive the molten glass and deliver it in separated masses to a mold, means for cooling the receiver, and a mold.

27. In apparatus for making glass insulators or other similar glass articles, the combination of devices for feeding molten glass from a furnace, means for heating the molten glass as it emerges from the furnace, means for automatically separating the glass into masses of the desired amount, a receiver separated from the point of discharge of the molten glass from the furnace adapted to receive the molten glass, and to deliver it automatically in separated masses to a mold, means for cooling the receiver, and a mold.

28. In apparatus for making glass insulators or other similar glass articles, the combination of devices for feeding molten glass from a furnace, means for heating the molten glass as it emerges from the furnace, means for automatically separating the glass into masses of the desired amount, a receiver separated from the point of discharge of the molten glass from the furnace adapted to receive the molten glass, and to deliver it automatically in separated masses to a mold.

29. The combination with a press for making glass insulators or other similar glass articles provided with one or more molds, of a leer for annealing the articles arranged with one end under the point of discharge of the glass insulators or other articles from the mold or molds of the press whereby said articles are discharged from the mold directly to the leer, and a carrier for receiving such article as discharged from the mold for conveying it through the leer.

In testimony whereof I have signed my name to this specification in the presence of two subscribing witnesses.

HENRY M. BROOKFIELD.

Witnesses:
JOHN O. GEMPLER,
EDWIN SEGER.